US012456802B2

(12) United States Patent
Du et al.

(10) Patent No.: US 12,456,802 B2
(45) Date of Patent: Oct. 28, 2025

(54) DUAL-BAND ANTENNA AND ANTENNA ARRAY

(71) Applicant: HUAWEI TECHNOLOGIES CO., LTD., Guangdong (CN)

(72) Inventors: Zijing Du, Xi'an (CN); Zhenxing Wan, Xi'an (CN); Guoqing Xie, Dongguan (CN); Weihong Xiao, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 18/153,827

(22) Filed: Jan. 12, 2023

(65) Prior Publication Data

US 2023/0170630 A1 Jun. 1, 2023

Related U.S. Application Data

(63) Continuation of application No. PCT/CN2021/106067, filed on Jul. 13, 2021.

(30) Foreign Application Priority Data

Jul. 15, 2020 (CN) ......................... 202010682426.5

(51) Int. Cl.
*H01Q 1/52* (2006.01)
*H01Q 1/24* (2006.01)
(Continued)

(52) U.S. Cl.
CPC ............. *H01Q 1/523* (2013.01); *H01Q 1/246* (2013.01); *H01Q 5/42* (2015.01); *H01Q 5/48* (2015.01);
(Continued)

(58) Field of Classification Search
CPC ............ H01Q 1/246; H01Q 1/36; H01Q 1/50; H01Q 1/52; H01Q 1/521; H01Q 1/523;
(Continued)

(56) References Cited

U.S. PATENT DOCUMENTS

2005/0179610 A1* 8/2005 Le .......................... H01Q 21/28 343/797
2015/0295313 A1* 10/2015 Zimmerman ............ H01Q 5/42 343/810

FOREIGN PATENT DOCUMENTS

CN 102868017 A 1/2013
CN 204497377 U 7/2015
(Continued)

OTHER PUBLICATIONS

Office Action in Chinese Appln. No. 202010682426.5, dated Apr. 28, 2023, 6 pages.
(Continued)

*Primary Examiner* — Robert Karacsony
(74) *Attorney, Agent, or Firm* — Fish & Richardson P.C.

(57) ABSTRACT

The present disclosure relates to dual-band antennas and antenna arrays. One example dual-band antenna includes a first radiating element and a second radiating element that are disposed on a reflection plate. An operating frequency band of the first radiating element is a first frequency band, and an operating frequency band of the second radiating element is a second frequency band. A minimum frequency of the first frequency band is greater than a maximum frequency of the second frequency band. The first radiating element includes a first feeding apparatus and a first radiator unit, the first feeding apparatus includes a coupling structure coupled to the first radiator unit, and the first feeding apparatus is used for coupled feeding for the first radiator unit by using the coupling structure.

16 Claims, 8 Drawing Sheets

(51) Int. Cl.

| | |
|---|---|
| ***H01Q 5/42*** | (2015.01) |
| ***H01Q 5/48*** | (2015.01) |
| ***H01Q 19/10*** | (2006.01) |
| ***H01Q 21/26*** | (2006.01) |
| ***H01Q 21/28*** | (2006.01) |

(52) U.S. Cl.
CPC .......... *H01Q 19/108* (2013.01); *H01Q 21/26* (2013.01); *H01Q 21/28* (2013.01)

(58) Field of Classification Search
CPC .. H01Q 5/10; H01Q 5/20; H01Q 5/40; H01Q 5/42; H01Q 5/48; H01Q 5/49; H01Q 5/30; H01Q 5/307; H01Q 5/314; H01Q 5/321; H01Q 5/328; H01Q 5/335; H01Q 19/10; H01Q 19/108; H01Q 21/00; H01Q 21/24; H01Q 21/26; H01Q 21/28; H01Q 21/062; H01Q 21/08
See application file for complete search history.

(56) References Cited

FOREIGN PATENT DOCUMENTS

| | | | |
|---|---|---|---|
| CN | 106134002 | A | 11/2016 |
| CN | 107359418 | A | 11/2017 |
| CN | 109687129 | A | 4/2019 |
| CN | 110112562 | A | 8/2019 |
| CN | 110165381 | A | 8/2019 |
| CN | 110429374 | A | 11/2019 |
| CN | 110797636 | A | 2/2020 |
| CN | 110808450 | A | 2/2020 |
| WO | 2015107473 | A1 | 7/2015 |
| WO | 2020057498 | A1 | 3/2020 |

OTHER PUBLICATIONS

Office Action in Chinese Appln. No. 202010682426.5, dated Jul. 11, 2022, 12 pages (with English translation).
International Search Report and Written Opinion in International Appln. No. PCT/CN2021/106067, mailed on Sep. 28, 2021, 14 pages (with English translation).
Extended European Search Report in European Appln No. 21843336.5, dated Dec. 11, 2023, 15 pages.

* cited by examiner

DUAL-BAND ANTENNA AND ANTENNA ARRAY

CROSS-REFERENCE TO RELATED APPLICATIONS

This application is a continuation of International Application No. PCT/CN2021/106067, filed on Jul. 13, 2021, which claims priority to Chinese Patent Application No. 202010682426.5, filed on Jul. 15, 2020. The disclosures of the aforementioned applications are hereby incorporated by reference in their entireties.

TECHNICAL FIELD

Embodiments of this application relate to the field of antenna technologies, and in particular, to a dual-band antenna and an antenna array.

BACKGROUND

With the popularization of a multi-frequency multi-array antenna technology in the field of base station antennas, dual-band antennas are increasingly widely used.

A dual-band antenna includes, for example, a high-frequency radiating element and a low-frequency radiating element, and a placement position and a feeding manner of the high-frequency radiating element affect the low-frequency radiating element.

Each high-frequency radiating element includes, for example, a balun feeding apparatus and a radiator arm structure. A sum of a distance between a ground terminal of the balun feeding apparatus and a connection terminal of the radiator arm structure, and an arm length of one radiator arm of the radiator arm structure is a preset length. The preset length is determined by an operating frequency band of the high-frequency element.

In some scenarios, the preset length is one quarter of a wavelength corresponding to an operating frequency of the low-frequency radiating element, so that the balun structure of the high-frequency radiating element and one radiator arm of the radiator arm structure may be exactly equivalent to a monopole antenna whose operating frequency is close to the frequency of the low-frequency element. The monopole antenna is an antenna with a vertical radiator arm.

When the low-frequency radiating element operates, the equivalent monopole antenna generates a low-frequency induced current under the influence of an electromagnetic wave radiated by the low-frequency element. The low-frequency induced current causes the high-frequency radiating element to radiate a low-frequency electromagnetic wave outwards. A frequency of the electromagnetic wave is approximately equal to a frequency of the electromagnetic wave radiated by the low-frequency element, causing interference to a signal radiated by the low-frequency radiating element.

SUMMARY

Embodiments of this application provide a dual-band antenna and an antenna array, to resolve a problem that a high-frequency radiating element causes interference to a low-frequency radiating element in a dual-band antenna.

To achieve the foregoing objective, the following technical solutions are used in this application: According to a first aspect, a dual-band antenna is provided, including a first radiating element and a second radiating element that are disposed on a reflection plate. An operating frequency band of the first radiating element is a first frequency band, and an operating frequency band of the second radiating element is a second frequency band. A minimum frequency of the first frequency band is greater than a maximum frequency of the second frequency band. In this application, the first radiating element operates in a high frequency band, the second radiating element operates in a low frequency band, and the first radiating element includes a first feeding apparatus and a first radiator unit. A sum of electrical lengths of a radiator arm of the first radiator unit and an electrical length of the first feeding apparatus may be changed, so that an operating frequency of the first radiating element is outside the second frequency band. This prevents the first radiating element from radiating an electromagnetic wave of the second frequency band, and further avoids mutual influence between electromagnetic waves radiated by a first radiator element and a second radiator element. The first feeding apparatus includes a coupling structure coupled to the first radiator unit, and the first feeding apparatus is used for coupled feeding for the first radiator unit by using the coupling structure. Because the first radiating element uses a coupled feeding manner, during adjustment of the sum of the electrical length of the radiator arm of the first radiator unit and the electrical length of the first feeding apparatus, only a size of the coupling structure needs to be changed, with no need to change a size of the radiator arm of the first radiator unit. This avoids influence on normal operation of the first radiator unit. In an operation process of the dual-band antenna, when the first radiating element transmits a signal outwards as a transmit antenna, a signal transmission path may be as follows: The signal is first transmitted to the coupling structure, and then transmitted to the first radiator unit. When the signal is transmitted to the coupling structure, the coupling structure may transmit a signal of the first frequency band, and block a signal of the second frequency band, so that a frequency of an electromagnetic wave generated by an equivalent monopole antenna is outside the operating frequency band of the second radiating element. Therefore, the first radiating element causes relatively weak interference to a signal transmitted by the second radiating element, and even does not cause interference to the signal transmitted by the second radiating element, so that the second radiating element can operate normally.

In an optional implementation, the first radiator unit includes four radiator arms, the four radiator arms are symmetrical with respect to a central axis of the first radiator unit, and a length l of each radiator arm satisfies $$\left|l-\frac{\lambda}{8}\right|\le A_1,$$

where λ is a wavelength of an electromagnetic wave of the first frequency band, and $A_1$ is a preset error threshold. Therefore, a structure of the first radiator unit is more flexible, and the four radiator arms are centrally symmetric, thereby reducing space of the dual-band antenna.

In an optional implementation, the first radiator unit includes two crossed radiator arms, each radiator arm is symmetrical with respect to a central axis of the radiator unit, and a length l of each radiator arm satisfies $$\left|l-\frac{\lambda}{4}\right|\le A_2,$$

where λ is a wavelength of an electromagnetic wave of the first frequency band, and $A_2$ is a preset error threshold. Therefore, a structure of the first radiator unit is more flexible, and the two radiator arms are crossed, thereby reducing space of the dual-band antenna.

In an optional implementation, the coupling structure includes a plurality of horizontal arms, the horizontal arm is symmetrical with respect to the central axis of the radiator unit, each horizontal arm is coupled to one radiator arm, and a spacing between the horizontal arm and the radiator arm that are coupled to each other is less than a preset value. Therefore, the horizontal arm in the coupling structure and the radiator arm are opposite to each other, and the horizontal arm may be used for coupled feeding for the radiator arm. The spacing between the horizontal arm and the radiator arm is less than the preset value, thereby improving a coupling effect.

In an optional implementation, the coupling structure further includes a plurality of vertical arms, the vertical arm is disposed close to the central axis of the radiator unit, the vertical arm is configured to connect the horizontal arm and the reflection plate, and the horizontal arm and the vertical arm form an inverted L-shaped conductive plate structure. Therefore, the vertical arm is disposed close to the central axis of the radiator unit. This can facilitate centralized feeding at the feeding port, thereby reducing space of the dual-band antenna.

In an optional implementation, a gap is provided between the plurality of vertical arms, the first feeding apparatus further includes crossed feeding sheets, and the feeding sheet is disposed in the gap between the vertical arms, and the feeding sheet is electrically connected to a feeding port on the reflection plate. Therefore, the first feeding apparatus implements feeding for the coupling structure by using the feeding sheets, and has a more stable connection, thereby improving electrical connection stability.

In an optional implementation, the first feeding apparatus further includes a feeder disposed on the vertical arm, and the feeder is electrically connected to a feeding port on the reflection plate. Therefore, the first feeding apparatus implements feeding for the coupling structure by using the feeder, and has a small size, thereby reducing space of the dual-band antenna.

In an optional implementation, a frequency in the first frequency band is twice a frequency in the second frequency band, and an equivalent electrical length of the coupling structure is less than one quarter of a wavelength corresponding to the second frequency band. Therefore, a structure that is in the coupling structure and that implements a filtering function of the coupling structure is mainly related to the equivalent electrical length of the coupling structure. A larger equivalent electrical length of the coupling structure leads to a lower frequency of a signal that can be transmitted by the coupling structure. A technician may set a coupling length of the coupling structure based on the operating frequency band of the first radiating element and the operating frequency band of the second radiating element. The coupling length of the coupling structure may be set to be within a preset value range, for example, may be set to be less than one quarter of the wavelength corresponding to the second frequency band, so that the coupling structure shields an electromagnetic wave of the second frequency band.

In an optional implementation, the radiator arm is a conductor arm, or a slot disposed in a conductor plate. Therefore, a structure of the radiator arm is more flexible, and has more choices.

In an optional implementation, the dual-band antenna further includes: a director apparatus, disposed on a side that is of the first radiator unit and that is far away from the reflection plate, and the director apparatus includes a plurality of metal sheets, and the metal sheets are respectively parallel to the radiator arms. Therefore, directivity of the first radiating element can be improved by disposing the director apparatus.

In an optional implementation, the second radiating element includes a second feeding apparatus and a second radiator unit, and the second feeding apparatus is electrically connected to the second radiator unit. Therefore, the second radiating element may radiate a low-frequency electromagnetic wave outwards in a direct feeding manner.

According to a second aspect of this application, an antenna array is provided, where the antenna array includes at least two dual-band antennas described above and a reflection plate; and each dual-band antenna is electrically connected to the reflection plate. Therefore, the antenna array using the dual-band antennas can prevent a high-frequency antenna from causing interference to a low-frequency antenna, has a simple structure, and can achieve a higher degree of integration.

Figure 3:
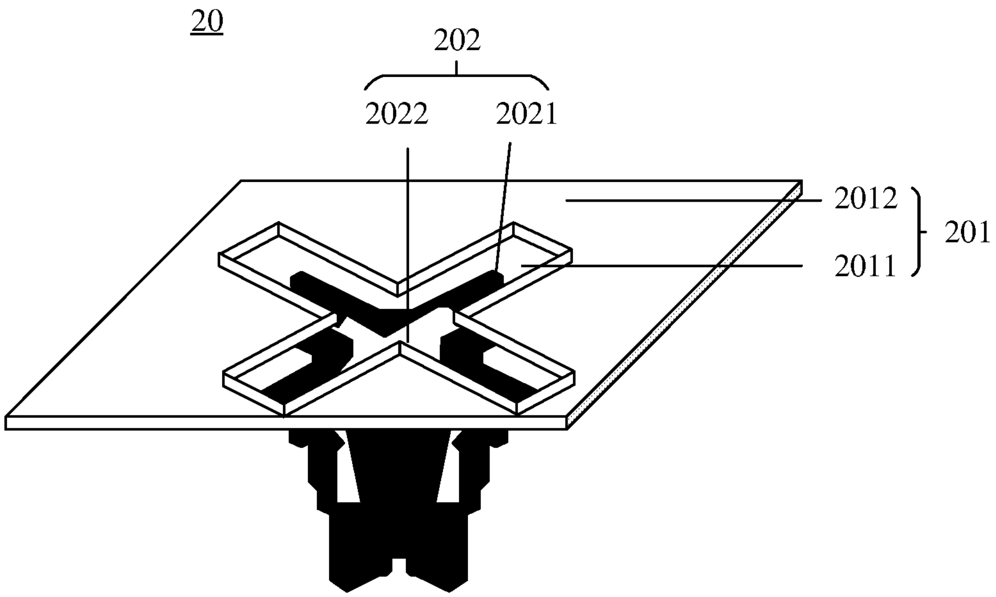
FIG. 3 is a schematic diagram of a structure of a first radiating element according to an embodiment of this application.
Figure 4:
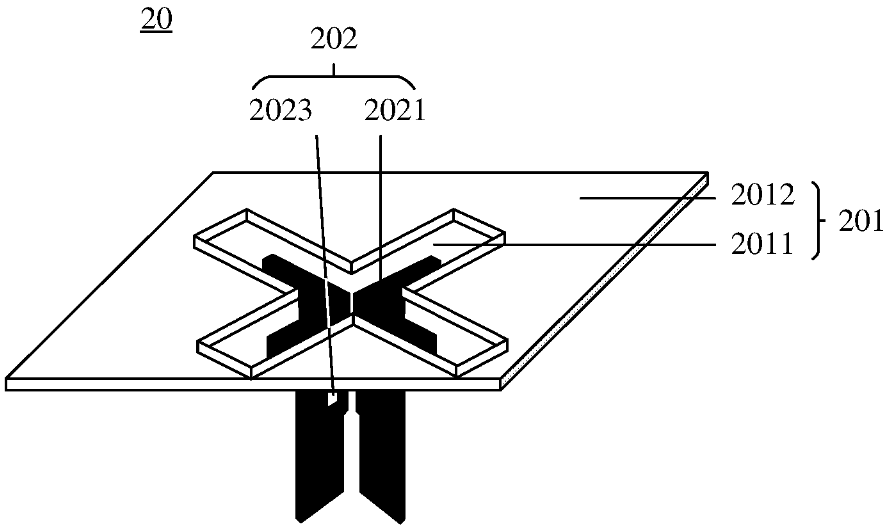
Figure 5:
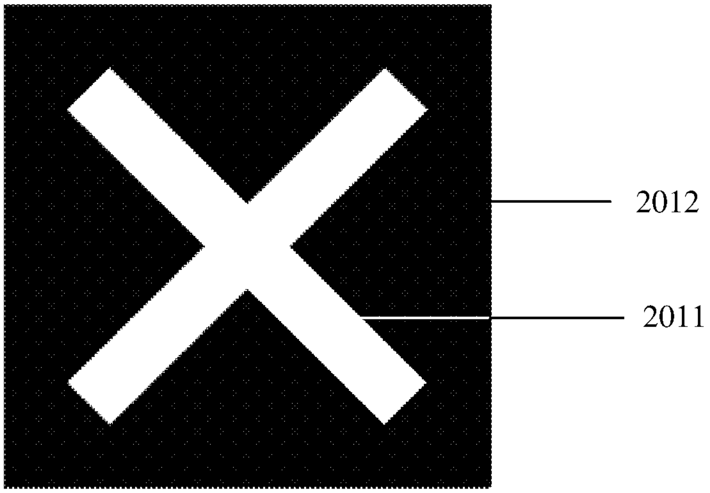
Figure 6:
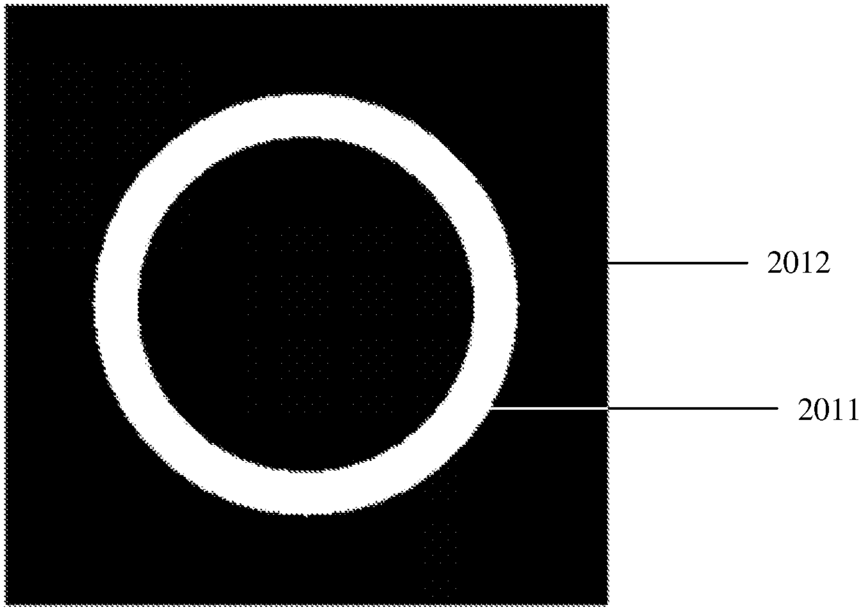
Figure 7:
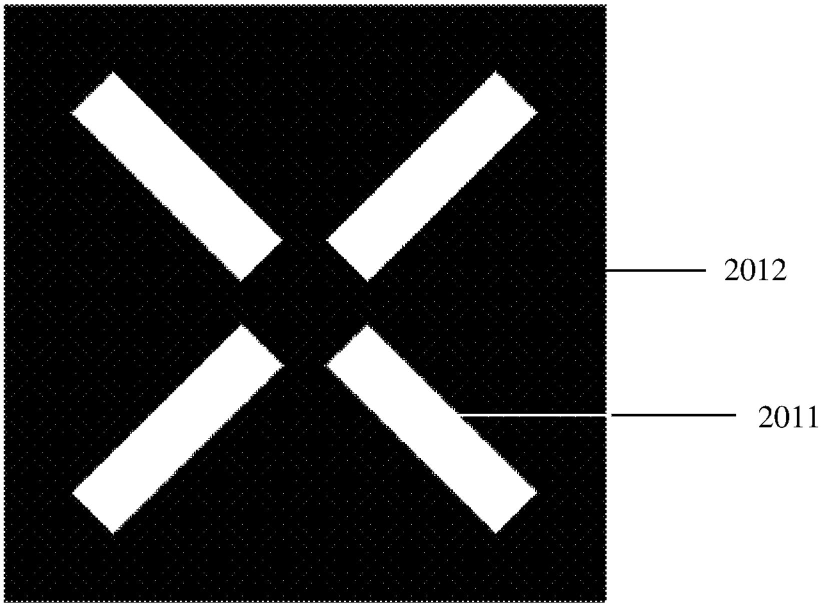
Figure 8:
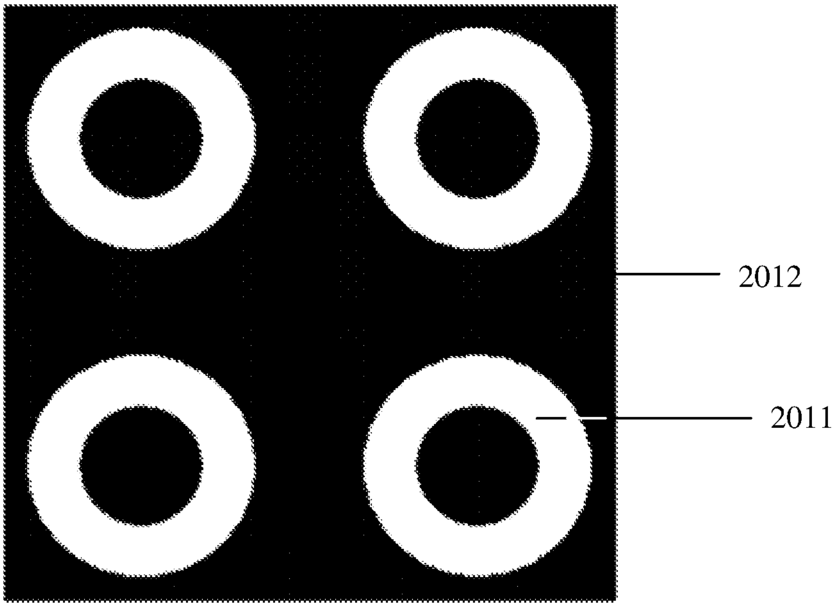

FIG. **3*a* is a schematic diagram of a structure of a feeding apparatus in FIG. 3**;

FIG. **3*b* is a top view of the feeding apparatus in FIG. 3**;

FIG. **3*c*** is a schematic diagram of a structure of another first radiating element according to an embodiment of this application;

FIG. 4 is a schematic diagram of a structure of another first radiating element according to an embodiment of this application;

FIG. **4*a* is a schematic diagram of a structure of a feeding apparatus in FIG. 4**;

FIG. **4*b* is a top view of the feeding apparatus in FIG. 4**;

FIG. **4*c*** is a schematic diagram of a structure of another first radiating element according to an embodiment of this application;

FIG. 5 is a schematic diagram of a structure of a first radiator unit according to an embodiment of this application;

FIG. 6 is a schematic diagram of a structure of another first radiator unit according to an embodiment of this application;

FIG. 7 is a schematic diagram of a structure of another first radiator unit according to an embodiment of this application; and FIG. 8 is a schematic diagram of a structure of another first radiator unit according to an embodiment of this application.

DESCRIPTION OF EMBODIMENTS

To make objectives, technical solutions, and advantages of this application clearer, the following further describes this application in detail with reference to the accompanying drawings.

The terms "first" and "second" mentioned below are merely intended for a purpose of description, and shall not be understood as an indication or implication of relative importance or implicit indication of the number of indicated technical features. Therefore, a feature limited by "first" or "second" may explicitly indicate or implicitly include one or more such features. In the descriptions of this application, unless otherwise stated, "a plurality of" means two or more than two.

In addition, in this application, orientation terms such as "above" and "below" are defined with respect to a placement orientation of a component shown in the accompanying drawings. It should be understood that these directional terms are relative concepts, are used for relative description and clarification, and may vary accordingly with a change in a placement orientation of a component in the accompanying drawings.

The following describes terms that may appear in embodiments of this application.

An electrical length is a ratio of a mechanical length (which may also be referred to as a physical length or a geometric length) of a propagation medium/structure to a wavelength of an electromagnetic wave propagated on the medium/structure.

Antenna aperture: In the antenna theory, an aperture (or an effective area) is a parameter indicating efficiency of receiving power of radio waves by using an antenna. The aperture is defined as an area that is perpendicular to a direction of an incident radio wave and that effectively intercepts energy of the incident radio wave.

Figure 1:
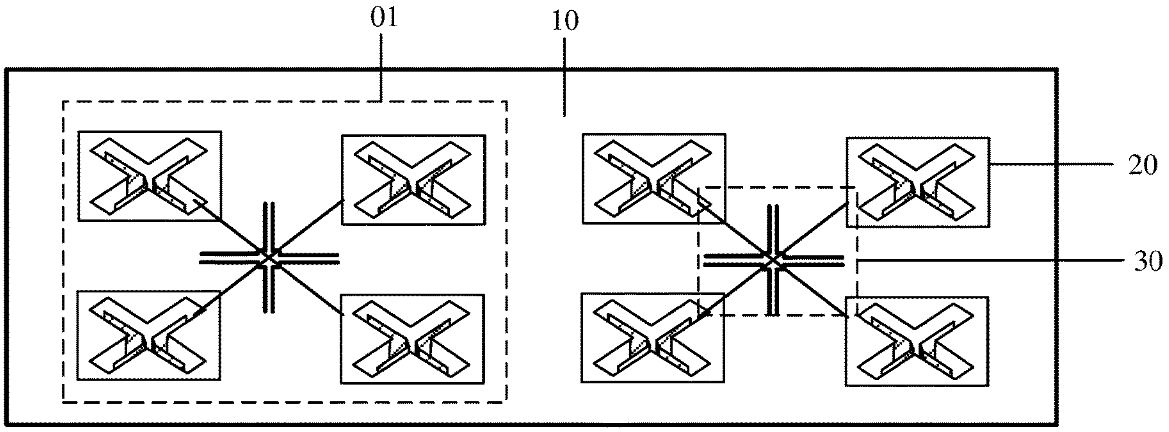
FIG. 1 is a top view of an antenna array according to an embodiment of this application.
Figure 2:
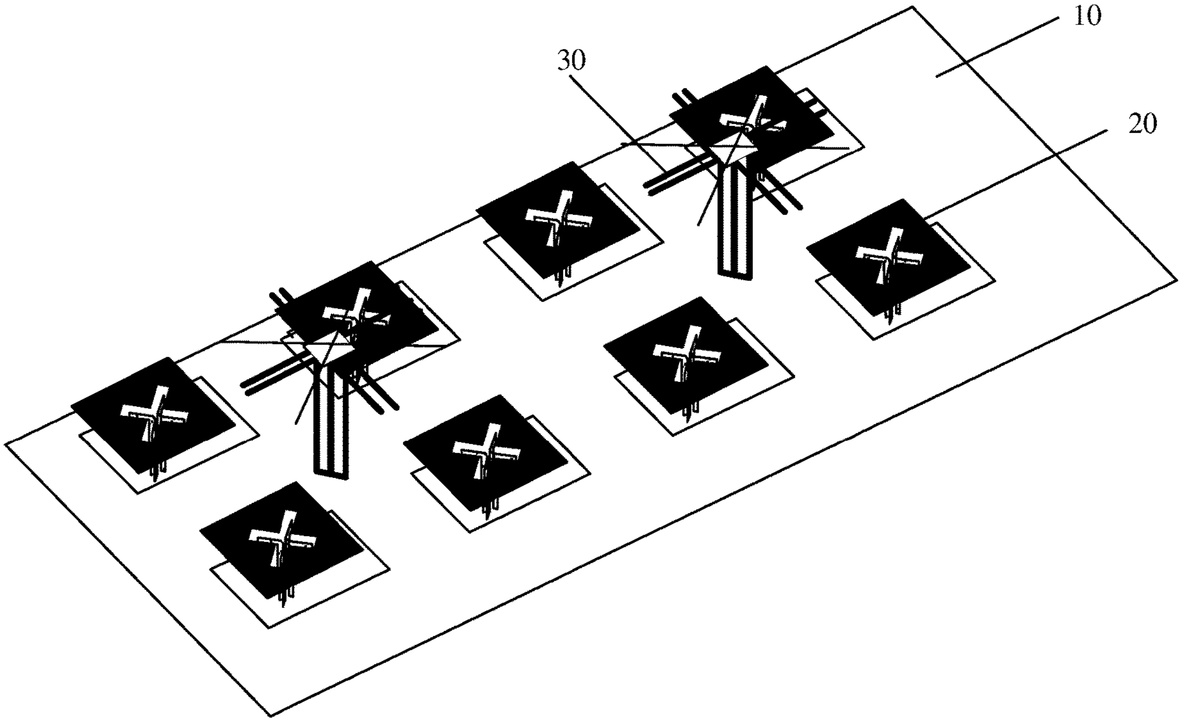
FIG. 2 is a schematic diagram of a structure of an antenna array according to an embodiment of this application.

First, refer to FIG. 1 and FIG. 2. FIG. 1 is a top view of an antenna array according to an embodiment of this application. FIG. 2 is a schematic diagram of a structure of an antenna array according to an embodiment of this application.

As shown in FIG. 1 and FIG. 2, the antenna array includes at least two dual-band antennas 01 and a reflection plate 10. Each dual-band antenna 01 is electrically connected to the reflection plate 10.

Next, refer to FIG. 1 and FIG. 2. The dual-band antenna 01 includes a first radiating element 20 and a second radiating element 30. An operating frequency band of the first radiating element 20 is a first frequency band, and an operating frequency band of the second radiating element 30 is a second frequency band. A minimum frequency of the first frequency band is greater than a maximum frequency of the second frequency band.

In this embodiment, the minimum frequency in the first frequency band is greater than the maximum frequency in the second frequency band, in other words, the operating frequency band of the first radiating element 20 is a high frequency band, and the operating frequency band of the second radiating element 30 is a low frequency band.

In an implementation, a frequency in the first frequency band is approximately twice a frequency in the second frequency band. In another implementation, the frequency in the first frequency band may be alternatively approximately another multiple of the frequency in the second frequency band. This is not specifically limited in this embodiment.

The dual-band antenna 01 is, for example, a 2.4 GHz dual-band antenna or a 5 GHz dual-band antenna. The first radiator operates, for example, in a 5 GHz frequency band, and the second radiator operates, for example, in a 2.4 GHz frequency band.

In this embodiment, to facilitate description of a structure of the first radiating element 20, as shown in FIG. 3 and FIG. 4, one first radiating element 20 may be used as an example.

The first radiating element 20 is a dipole radiating element, and includes a first radiator unit 201 and a first feeding apparatus 202.

In a conventional technology, the first radiator unit 201 and the first feeding apparatus 202 in the first radiating element 20 are directly electrically connected to each other. In some scenarios, a length of one radiator arm of the first radiator unit 201 and the first feeding apparatus 202 is close to one quarter of a wavelength of the operating frequency band of the second radiating element 30. When the first radiating element 20 and the second radiating element 30 operate simultaneously, the one radiator arm of the first radiator unit 201 and the first feeding apparatus 202 may be exactly equivalent to a monopole 02 whose operating frequency is close to the frequency of the low-frequency element. In this case, the first feeding apparatus of the first radiating element and the monopole 02 may be exactly equivalent to a monopole antenna whose operating frequency is close to an operating frequency of the second radiating element, and further the first radiating element 20 operates within the operating frequency band of the second radiating element 30. A field excited when the equivalent monopole antenna operates is superimposed on a field excited when the second radiating element 30 operates. As a result, a radiation pattern of the second radiating element 30 is deformed.

In some embodiments, a sum of electrical lengths of the radiator arm of the first radiator unit and the first feeding apparatus may be changed, so that an operating frequency of the first radiating element is outside the second frequency band. This prevents the first radiating element from radiating an electromagnetic wave of the second frequency band, and further avoids mutual influence between electromagnetic waves radiated by a first radiator and a second radiator. However, because the first radiator unit 201 is directly electrically connected to the first feeding apparatus 202, a change in the sum of the electrical length of the radiator arm of the first radiator unit and the electrical length of the first feeding apparatus causes influence on an electromagnetic wave of the first frequency band.

Therefore, the first radiating element 20 is improved in this embodiment of this application.

As shown in FIG. 3 and FIG. 4, the first feeding apparatus 202 includes a coupling structure 2021 coupled to the first radiator unit 201, and the first feeding apparatus 202 performs coupled feeding on the first radiator unit 201 by using the coupling structure 2021. The coupling structure 2021 is configured to transmit a signal of the first frequency band, and block a signal of the second frequency band.

It should be noted that, coupled feeding means that conduction of electric energy in the communications field or the like that is performed in a coupling manner between two circuit elements or circuit networks that are not in contact with each other and between which there is a specific small distance. In this way, one of the elements obtains energy when being not in direct contact with an electric energy conduction system. In this embodiment, the first radiator unit 201 is not in direct contact with the first feeding apparatus 202, and the first feeding apparatus 202 implements feeding for the first radiator unit 201 in a capacitive coupling manner.

Because the first radiating element uses a coupled feeding manner, during adjustment of the sum of the electrical length of the radiator arm of the first radiator unit and the electrical length of the first feeding apparatus, only a size of the coupling structure needs to be changed, with no need to change a size of the radiator arm of the first radiator unit. This avoids influence on normal operation of the first radiator unit.

When the first radiating element 20 transmits a signal outwards as a transmit antenna, a signal transmission path may be as follows: The signal is transmitted to the coupling structure 2021 through a feeder. When the signal is transmitted to the coupling structure 2021, because the coupling structure 2021 may transmit a signal of the first frequency band, and block a signal of the second frequency band, a signal whose signal frequency is within the first frequency band may continue to be transmitted to the first radiator unit 201 coupled to the coupling structure 2021, and then radiated outwards in a form of an electromagnetic wave, and frequencies of transmitted electromagnetic waves are all greater than a preset threshold.

Even if the radiator arm of the first radiating element 20 and the coupling structure 2021 may be exactly equivalent to a monopole antenna whose operating frequency is close to the frequency of the second radiating element 30, due to the existence of the coupling structure 2021, frequencies of electromagnetic waves generated by the equivalent monopole antenna are all higher than the maximum frequency in the second frequency band, and the frequencies of the electromagnetic waves generated by the equivalent monopole antenna are outside the operating frequency band of the second radiating element 30. Therefore, the equivalent monopole antenna causes relatively weak interference to a signal radiated and transmitted by the low-frequency element, and even does not cause interference to the signal radiated and transmitted by the low-frequency element, so that the second radiating element 30 can operate normally.

In some implementations of this application, a structure that is in the coupling structure 2021 and that implements a filtering function of the coupling structure 2021 is mainly related to an equivalent electrical length of the coupling structure 2021. The equivalent electrical length of the coupling structure 2021 is approximately 1 to 1.5 times of an actual electrical length thereof. The equivalent electrical length of the coupling structure 2021 is an electrical length that is corresponding to a transmission frequency and that is obtained through equivalent processing based on a phase change during transmission of an electromagnetic wave of each frequency.

A larger equivalent electrical length of the coupling structure 2021 leads to a lower frequency of a signal that can be transmitted by the coupling structure 2021. A technician may set a size of the coupling structure 2021 based on the operating frequency band of the first radiating element 20 and the operating frequency band of the second radiating element 30, so that the equivalent electrical length of the coupling structure 2021 may be set to be within a preset value range, for example, may be set to be less than one quarter of a wavelength corresponding to the second frequency band.

In the dual-band antenna 01 provided in this embodiment of this application, the sum of the electrical lengths of the radiator arm of the first radiator unit 201 and the first feeding apparatus differs greatly from one quarter of the wavelength corresponding to the second frequency band, so that the operating frequency of the first radiating element 20 is outside the second frequency band. This prevents the first radiating element 20 from radiating an electromagnetic wave of the second frequency band, and can avoid mutual influence between electromagnetic waves radiated by the first radiator and the second radiator.

Because the first radiating element 20 uses a coupled feeding manner, during adjustment of a coupling length of the coupling structure 2021, only a size of the first feeding apparatus 202 needs to be changed, with no need to change a size of the first radiator unit 201. In this case, an operation is more convenient, and an electromagnetic wave of the first frequency band radiated by the first radiator unit 201 is not affected.

Next, refer to FIG. 3. The dual-band antenna 01 further includes a reflection plate 10.

A specific structure of the reflection plate 10 is not limited in this embodiment of this application. In an implementation of this application, the reflection plate 10 is a metal plate.

In another implementation of this application, the reflection plate 10 includes a conductor plate and a conducting layer disposed on the conductor plate. The conductor plate includes, for example, a first surface and a second surface that are opposite to each other. The conducting layer may be disposed on the first surface of the conductor plate and/or the second surface of the conductor plate.

In this embodiment, the reflection plate 10 includes, for example, the first surface, the first surface is used to carry the first radiating element 20, and the first surface is further provided with, for example, the conducting layer.

For example, the second radiating element 30 is electrically connected to the conducting layer on the first surface. The conducting layer may implement mirror reflection on the first radiating element 20 and the second radiating element 30.

According to the image theory based on an electromagnetic wave, an equivalent electrical length of the first radiating element 20 is equal to a sum of an actual total electrical length of the first radiator unit 201 and the first feeding apparatus 202 and electrical lengths of mirror images of the first radiator unit 201 and the first feeding apparatus 202 at the conducting layer. In other words, the equivalent electrical length of the first radiating element 20 is twice the actual total electrical length of the first radiator unit 201 and the first feeding apparatus 202. To be specific, an electromagnetic wave whose frequency is within the first frequency band may be transmitted or received, provided that a sum of the electrical lengths of the first radiator unit 201 and the first feeding apparatus 202 is equal to one half of a wavelength corresponding to the first frequency band.

Similarly, an electromagnetic wave whose frequency is within the second frequency band may be transmitted or received, provided that an equivalent electrical length of the second radiating element 30 is equal to one half of the wavelength corresponding to the second frequency band. The wavelength corresponding to the first frequency band and the wavelength corresponding to the second frequency band are wavelengths in free space.

In the dual-band antenna 01 shown in this embodiment of this application, the conducting layer is used to implement mirror reflection on the first radiating element 20 and the second radiating element 30, so that the equivalent electrical length of the first radiating element 20 and the equivalent electrical length of the second radiating element 30 are respectively twice the electrical length of the first radiating element 20 and the electrical length of the second radiating element 30. This is equivalent to that a mechanical length of each of the first radiating element 20 and the second radiating element 30 is reduced by half, thereby reducing a size of the dual-band antenna 01. This not only reduces preparation costs of the dual-band antenna 01, but also improves structural compactness of the dual-band antenna 01, thereby facilitating miniaturized design of the dual-band antenna 01.

In this embodiment of this application, a structure of the first radiator unit 201 is not limited. The first radiator unit 201 is, for example, coupled to the first feeding apparatus 202, and the first radiator unit 201 is parallel to the reflection plate 10. The first radiating element 20 may be a dipole antenna, in other words, the first radiator unit 201 includes a pair of radiator arms symmetrically disposed.

In some embodiments of this application, the first radiator unit 201 is, for example, a metal conductor. It should be noted that, FIG. 3 and FIG. 4 are described by using an example in which a first radiator arm and a second radiator arm of the first radiator unit 201 are crossed radiator arms symmetrical with each other. The radiator arms each may be in a shape and structure such as a sheet shape, an annular shape, or a cylindrical shape. This is not limited in this application.

In some other embodiments of this application, as shown in FIG. 3 and FIG. 4, the first radiator unit 201 includes a metal plate 2012 and a slot 2011 disposed in the metal plate 2012, and the slot 2011 may be used as a radiator arm.

It should be noted that, FIG. 3 and FIG. 4 are merely used as some examples to describe the first radiator arm and the second radiator arm of a possible structure provided with the slot 2011. The slot 2011 may be in any shape, as shown in FIG. 5, FIG. 6, FIG. 7, and FIG. 8. The radiator arm may be a circular slot, two crossed strip slots, four centrally-symmetric strip slots, or four centrally-symmetric metal slots. This is not limited in this application.

In the foregoing embodiment, there are two or four radiator arms, and the two or four radiator arms are symmetrically disposed, and a symmetry axis of the radiator arms is a central axis between the two radiator arms. The central axis is also a central axis of the first radiating element 20. Unless otherwise specified, each symmetry axis in structures mentioned below is a central axis of the first radiator unit 201.

It should be noted that, when there are four radiator arms, the four radiator arms are symmetrical with respect to a central axis of the first radiator unit, and a length l of each radiator arm satisfies $$\left|l-\frac{\lambda}{8}\right|\le A_1,$$

where λ is a wavelength of an electromagnetic wave of the first frequency band, and $A_1$ is a preset error threshold.

When there are two radiator arms, the two radiator arms are crossed, each radiator arm is symmetrical with respect to a central axis of the radiator unit, and a length l of each radiator arm satisfies $$\left|l-\frac{\lambda}{4}\right|\le A_2,$$

where λ is a wavelength of an electromagnetic wave of the first frequency band, and $A_2$ is a preset error threshold.

An aperture of the first radiator unit 201 is approximately one half of a wavelength corresponding to the operating frequency band. It should be noted that, in some embodiments of this application, the metal plate 2012 in the first radiator unit 201 uses a square structure, and the aperture of the first radiator unit 201 may be a side length of the metal plate 2012.

A structure of the first feeding apparatus 202 is not limited in this application. It should be noted that, the first feeding apparatus 202 may be a feeding apparatus of any structure and form, for example, a coaxial feeding apparatus, a balun feeding apparatus, or a waveguide feeding apparatus.

In some embodiments of this application, the first radiating element 20 may be a dipole antenna, in other words, the first radiating element 20 includes a pair of radiator arms symmetrically disposed; and two ends that are of the two radiator arms and that are close to each other are both connected to a feeder. The first feeding apparatus 202 is, for example, a balun feeding apparatus, and the coupling structure 2021 is, for example, a balun.

The dipole antenna is a balanced antenna, and a coaxial cable is an unbalanced transmission line. If the dipole antenna and the coaxial cable are directly connected to each other, a high-frequency current flows through a sheath of the coaxial cable (according to a coaxial-cable transmission principle, the high-frequency current should flow inside the coaxial cable, the sheath is a shield layer with no current). In this case, radiation of the dipole antenna is affected (it may be supposed that the shield layer of the coaxial cable also participates in electromagnetic wave radiation). By adding a balun between the dipole antenna and the coaxial cable, a current flowing into the exterior of the shield layer of the coaxial cable can be choked off. In other words, the high-frequency current flowing through the shield layer sheath of the coaxial cable from the radiator arm can be cut off, to implement conversion between unbalanced antenna feeding and balanced antenna feeding.

The first feeding apparatus 202 may be disposed perpendicular to the reflection plate 10. For example, a feeding port is disposed at a bottom of the first feeding apparatus 202. The feeding port is connected to a radio frequency module through, for example, a feeder (not shown in the figure). Through the feeding port, the first radiating element 20 may receive an electromagnetic signal sent by the radio frequency module or send a received external electromagnetic signal to the radio frequency module.

Figure 3A:
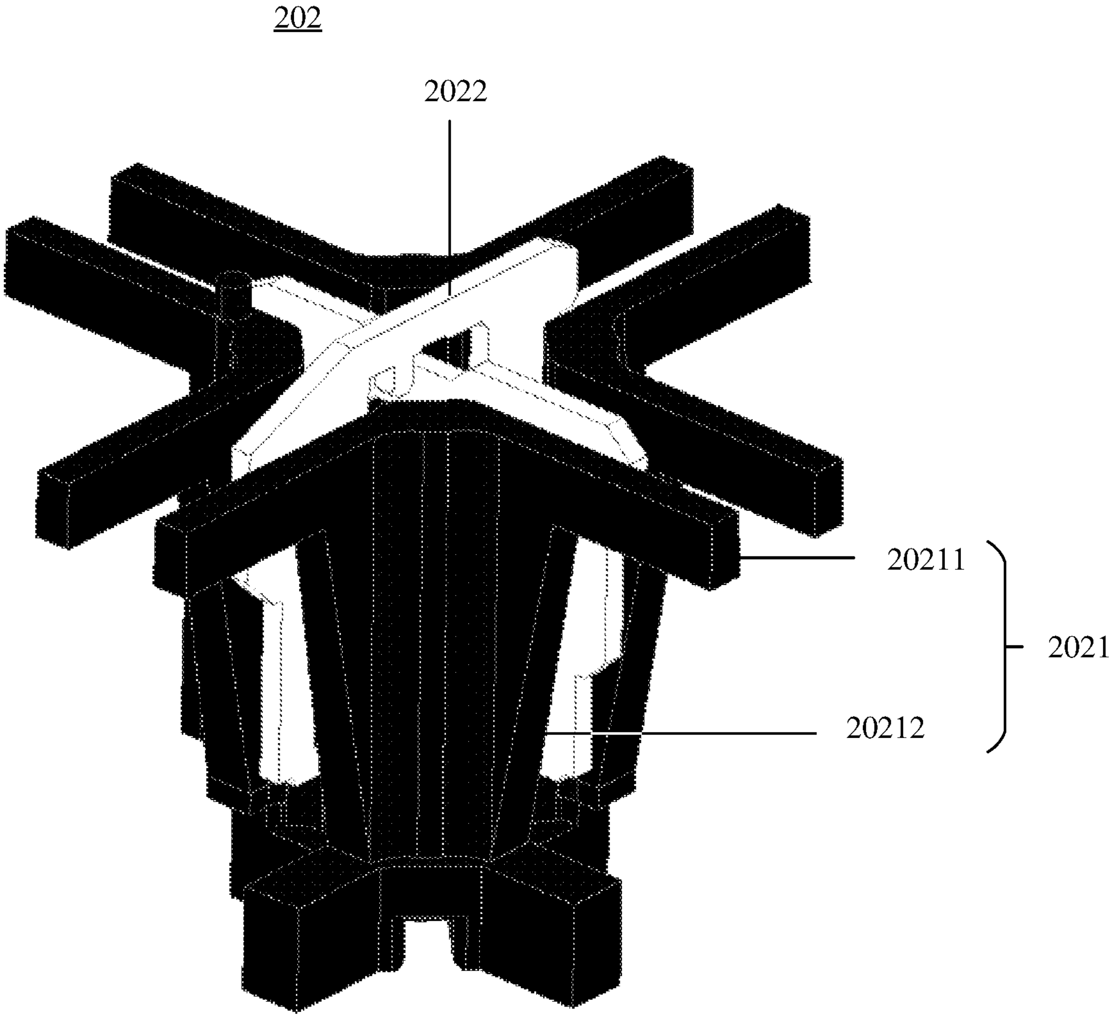
Figure 3B:
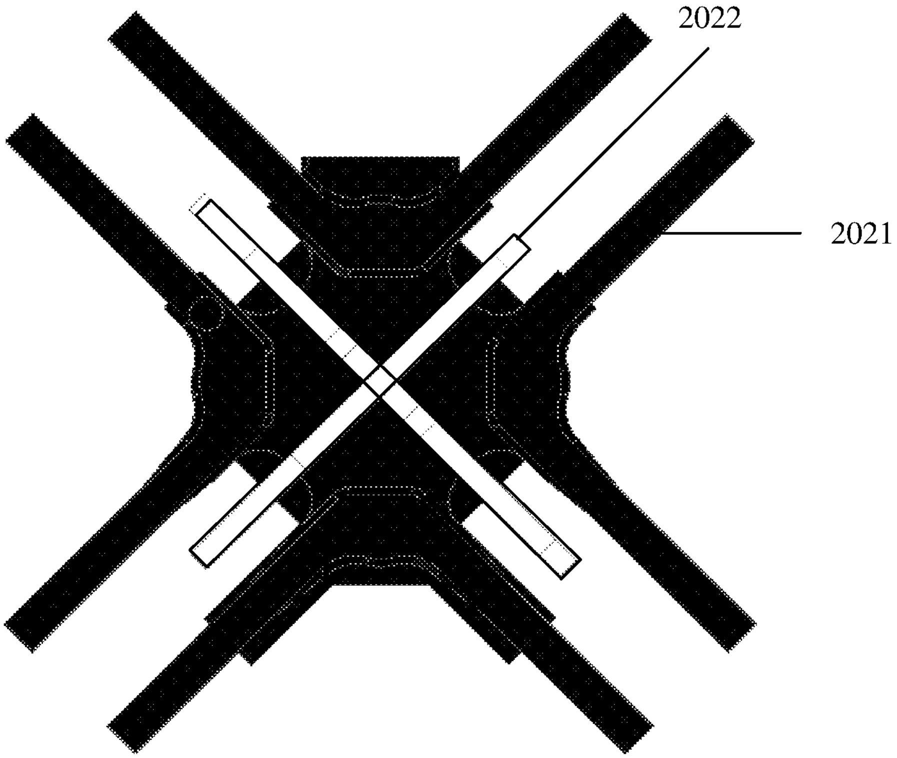

As shown in FIG. 3, FIG. 3*a*, and FIG. 3*b*, the first feeding apparatus 202 includes a coupling structure 2021 and a feeding sheet 2022. The coupling structure 2021 includes a plurality of horizontal arms 20211 and a plurality of vertical arms 20212. The horizontal arm 20211 is disposed close to the radiator arm, and is coupled to the radiator arm, and a spacing between the horizontal arm 20211 and the radiator arm is, for example, less than a preset value. Therefore, the horizontal arm can be used for coupled feeding for the radiator arm. The spacing between the horizontal arm and the radiator arm is less than the preset value, so that a coupling effect can be improved.

The vertical arm 20212 is disposed close to the central axis of the radiator unit, and the vertical arm 20212 is configured to connect the horizontal arm 20211 and the reflection plate 10. The vertical arm 20212 and the horizontal arm 20211 form a conductive plate of an inverted L-shaped structure.

Refer to FIG. 3*a* and FIG. 3*b*. There are eight coupling structures 2021. Vertical arms 20212 of two adjacent coupling structures 2021 are connected to each other. Adjacent horizontal arms 20211 form a "V"-shaped structure, and four "V"-shaped arms are formed in total. In each "V"-shaped arm, at least one horizontal arm 20211 is opposite to one radiator arm.

For example, a slot 2011 is disposed between adjacent "V"-shaped structures. The first feeding apparatus 202 further includes crossed feeding sheets 2022, and the feeding sheet 2022 is disposed in the slot 2011 between the vertical arms 20212.

Specific sizes of the horizontal arm 20211 and the vertical arm 20212 are not limited in this application. In some embodiments of this application, a frequency in the first frequency band is approximately twice a frequency in the second frequency band. To prevent the first radiating element from causing interference to the second radiating element, an electrical length of the horizontal arm 20211 may be, for example, greater than one eighth of a wavelength corresponding to the first frequency band and less than one quarter of the wavelength corresponding to the first frequency band, and an electrical length of the vertical arm 20212 may be greater than one eighth of the wavelength corresponding to the first frequency band and less than one quarter of the wavelength corresponding to the first frequency band; in other words, an electrical length of the coupling structure 2021 is greater than one quarter of the wavelength corresponding to the first frequency band and less than one half of the wavelength corresponding to the first frequency band.

The electrical length of the coupling structure 2021 is approximately a sum of the electrical lengths of the horizontal arm 20211 and the vertical arm 20212. When the electrical length of the coupling structure 2021 is greater than one quarter of the wavelength corresponding to the first frequency band and less than one half of the wavelength corresponding to the first frequency band, this is approximately equivalent to that the electrical length of the coupling structure 2021 is greater than one eighth of a wavelength corresponding to the second frequency band and less than one quarter of the wavelength corresponding to the second frequency band. A frequency of an electromagnetic wave generated by a monopole antenna to which the coupling structure is equivalent is outside the operating frequency band of the second radiating element 30. Therefore, the equivalent monopole antenna causes relatively weak interference to a signal radiated and transmitted by the low-frequency element, and even does not cause interference to the signal radiated and transmitted by the low-frequency element, so that the second radiating element 30 can operate normally.

Certainly, in some other embodiments of this application, the electrical length of the coupling structure 2021 may be alternatively less than or equal to one eighth of the wavelength corresponding to the second frequency band. In this way, a frequency of an electromagnetic wave generated by a monopole antenna to which the coupling structure is equivalent is outside the operating frequency band of the second radiating element 30. Therefore, the equivalent monopole antenna causes relatively weak interference to a signal radiated and transmitted by the low-frequency element, and even does not cause interference to the signal radiated and transmitted by the low-frequency element, so that the second radiating element 30 can operate normally.

It should be noted that, FIG. 3*a* is merely used as an example. A shape of the coupling structure 2021 is not limited in this application, in other words, the coupling structure 2021 may be a conductive plate in any shape such as an inverted L shape, a rectangle, a square, or a triangle, provided that one edge of the conductive plate is opposite to one radiator arm. In addition, if the first feeding apparatus 202 includes a plurality of conductive plates (for example, a structure shown in FIG. 3*a*). A cross angle of the plurality of conductive plates is not limited in this application. The plurality of conductive plates may be crossed at 90°, or may be crossed in a "V" shape at another angle.

Figure 4A:
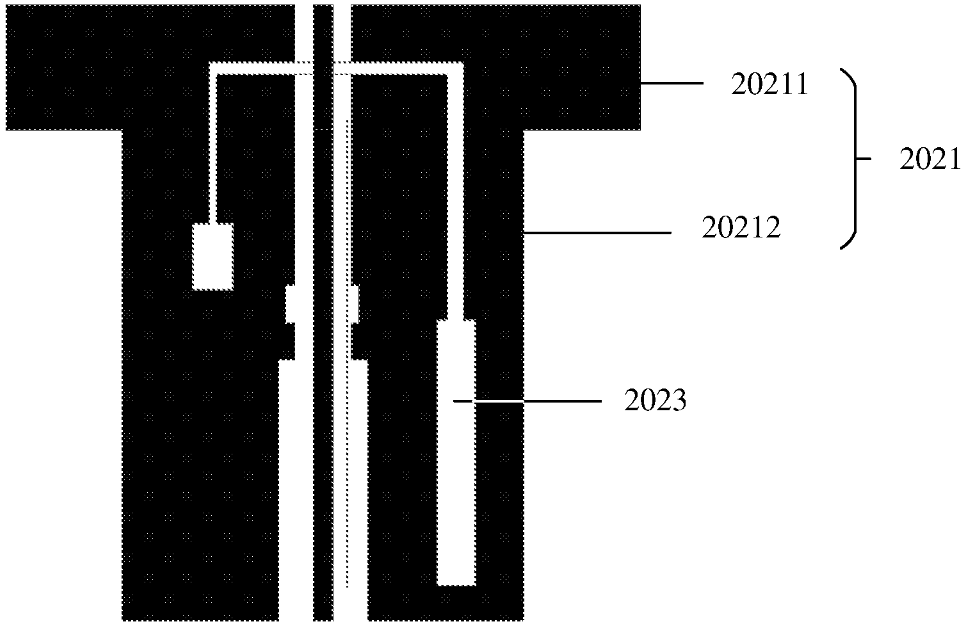
Figure 4B:
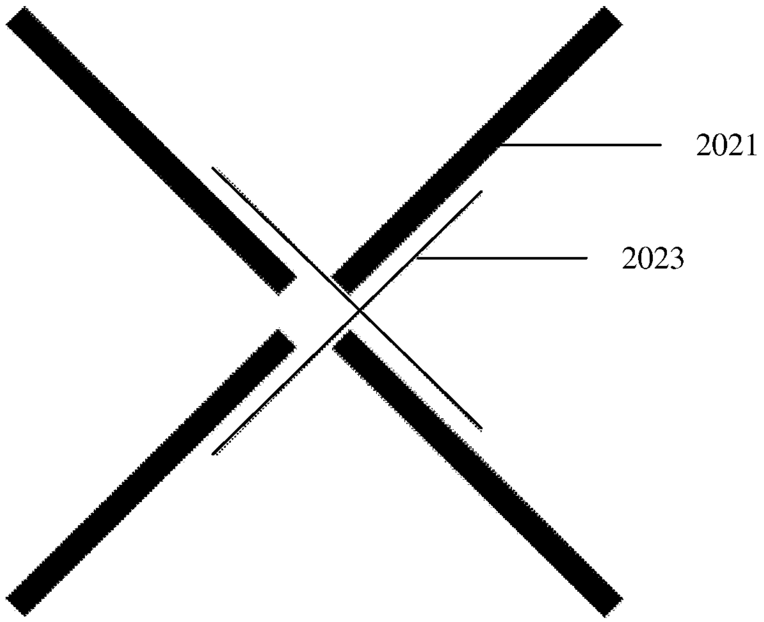

FIG. 4, FIG. 4*a*, and FIG. 4*b* are structural diagrams of a first feeding apparatus 202 according to an embodiment of this application. As shown in FIG. 4, the first feeding apparatus 202 includes a coupling structure 2021 and a microstrip line 2023.

The coupling structure 2021 includes a horizontal arm 20211 and a vertical arm 20212. The horizontal arm 20211 is symmetrical with respect to a central axis of the radiator unit, each horizontal arm is coupled to one radiator arm, and a spacing between the horizontal arm 20211 and the radiator arm is, for example, less than a preset value. Therefore, the horizontal arm can be used for coupled feeding for the radiator arm. The spacing between the horizontal arm and the radiator arm is less than the preset value, so that a coupling effect can be improved.

The vertical arm 20212 is disposed close to the central axis of the radiator unit, the vertical arm 20212 is configured to connect the horizontal arm 20211 and the reflection plate 10. The vertical arm 20212 and the horizontal arm 20211 form a conductive plate of an inverted L-shaped structure.

For specific sizes of the horizontal arm 20211 and the vertical arm 20212, refer to the foregoing embodiment. Details are not described herein again.

There are four coupling structures 2021. The four coupling structures 2021 are in a one-to-one correspondence with the foregoing radiator arms, and a symmetry axis thereof is the foregoing central axis. Vertical arms 20212 of two adjacent coupling structures 2021 are connected to each other, and horizontal arms 20211 thereof form a "V"-shaped structure.

In addition, the vertical arm 20212 is further provided with, for example, the microstrip line 2023, and the feeder is electrically connected to the feeding port on the reflection plate 10. A shape of the microstrip line 2023 may be an "L" shape.

The shape of the microstrip line 2023 may be alternatively any other straight line shape, curve shape, or fold line shape, for example, a "straight line" shape, an "I" shape, a "U" shape, a "V" shape, a "W" shape, or an "S" shape.

By using the first feeding apparatus 202 shown in FIG. 3*a* and FIG. 4*a*, feeding on the antenna radiating element and conversion to balanced antenna feeding can be implemented.

FIG. 3*a* and FIG. 4*a* show examples provided based on the first radiator unit 201 of a structure shown in FIG. 5. Actually, for the first radiator unit 201 of a structure shown in FIG. 6, FIG. 7, or FIG. 8 or any other structure, a balun apparatus whose shape is similar to that of the radiator arm may be selected.

In a possible structure, the balun apparatus may be a bowl-like structure.

In another possible structure, the balun apparatus may be a monopole structure that uses differential feeding.

An equivalent electrical length of the coupling structure 2021 is, for example, less than one quarter of the wavelength corresponding to the second frequency band.

Figure 3C:
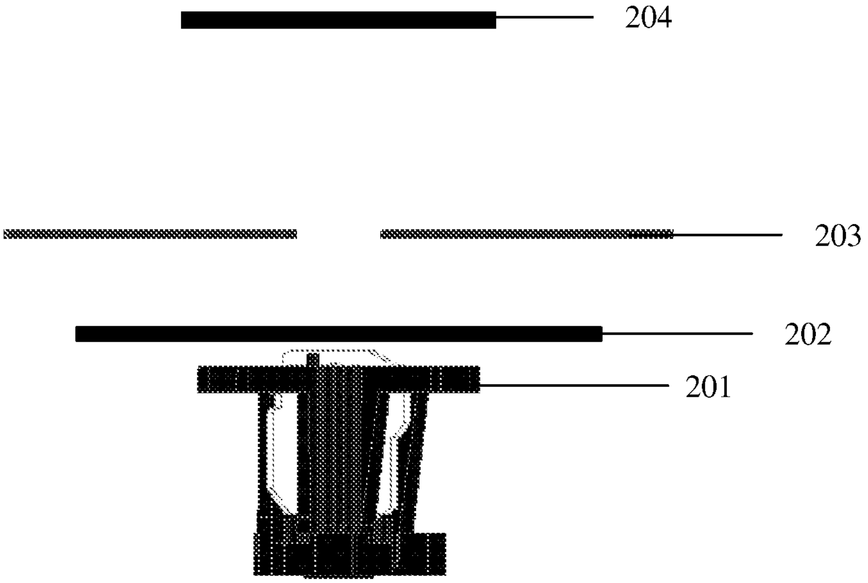
Figure 4C:
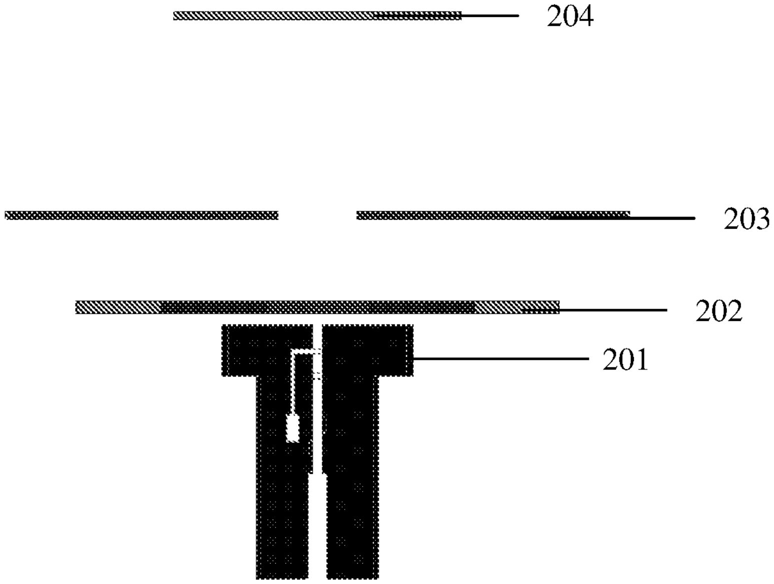

In addition, as shown in FIG. 3*c* and FIG. 4*c*, the first radiating element 20 further includes a first director apparatus 203. The first director apparatus 203 includes, for example, four orthogonally distributed metal sheets, and the metal sheets are respectively parallel to the radiator arms. When the first radiator unit 201 operates, the first director apparatus 203 may generate an induced current under the action of the first radiator unit 201, and further direct an electromagnetic wave generated by the first radiator unit 201 to be radiated toward a direction in which the first director apparatus 203 is located. In this way, a gain of the first radiating element 20 is improved.

Therefore, directivity of the first radiating element can be improved by disposing the first director apparatus 203 in a radiation direction of the first radiating element 20.

In another implementation of this application, the first radiating element 20 further includes a second director apparatus 204, and the second director apparatus 204 includes, for example, a metal sheet disposed close to a center of the first radiator unit 201. The electromagnetic wave generated by the first radiator unit 201 may be further directed to be radiated toward a direction in which the second director apparatus 204 is located. In this way, directivity of the first radiating element 20 is improved.

A structure of the second radiating element 30 is not limited in this embodiment of this application. In some embodiments of this application, as shown in FIG. 2, the second radiating element 30 may include a second feeding apparatus and a second radiator unit, and the second feeding apparatus is electrically connected to the second radiator unit.

In the dual-band antenna provided in this embodiment of this application, the second radiating element may radiate a low-frequency electromagnetic wave outwards in a direct feeding manner.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A dual-band antenna, comprising a first radiating element and a second radiating element that are disposed on a reflection plate, wherein:

an operating frequency band of the first radiating element is a first frequency band, an operating frequency band of the second radiating element is a second frequency band, and a minimum frequency of the first frequency band is greater than a maximum frequency of the second frequency band; and the first radiating element comprises a first feeding apparatus and a first radiator unit, the first feeding apparatus comprises a coupling structure coupled to the first radiator unit, the coupling structure comprises a plurality of horizontal arms and a plurality of vertical arms, the horizontal arms are symmetrical with respect to a central axis of the first radiator unit, each horizontal arm is coupled to one radiator arm, a spacing between a horizontal arm and a radiator arm that are coupled to each other is less than a preset value, the vertical arms are disposed close to the central axis of the first radiator unit, the vertical arms are configured to connect the horizontal arms and the reflection plate, the horizontal arms and the vertical arms from an inverted L-shaped conductive plate structure, and the first feeding apparatus is used for coupled feeding for the first radiator unit by using the coupling structure, wherein the coupling structure is configured to:

transmit a signal of the first frequency band; and block a signal of the second frequency band;

wherein:

a gap is provided between the vertical arms, the first feeding apparatus further comprises crossed feeding sheets, the feeding sheets are disposed in the gap between the vertical arms, and the feeding sheets are electrically connected to a feeding port on the reflection plate; or the first feeding apparatus further comprises a feeder disposed on the vertical arms, and the feeder is electrically connected to a feeding port on the reflection plate.

2. The dual-band antenna according to claim 1, wherein the first radiator unit comprises four radiator arms, the four radiator arms are symmetrical with respect to the central axis of the first radiator unit, and a length l of each radiator arm satisfies $$\left|l-\frac{\lambda}{8}\right|\leq A_1,$$

wherein λ is a wavelength of an electromagnetic wave of the first frequency band, and wherein $A_1$ is a preset error threshold.

3. The dual-band antenna according to claim 1, wherein the first radiator unit comprises two crossed radiator arms, each radiator arm is symmetrical with respect to the central axis of the first radiator unit, and a length l of each radiator arm satisfies $$\left|l-\frac{\lambda}{4}\right|\leq A_2,$$

wherein λ is a wavelength of an electromagnetic wave of the first frequency band, and wherein $A_2$ is a preset error threshold.

4. The dual-band antenna according to claim 2, wherein a frequency in the first frequency band is twice a frequency in the second frequency band, and an equivalent electrical length of the coupling structure is less than one quarter of a wavelength corresponding to the second frequency band.

5. The dual-band antenna according to claim 2, wherein each radiator arm is a conductor arm or a slot disposed in a conductor plate.

6. The dual-band antenna according to claim 2, wherein a first director apparatus is disposed on a side that is of the first radiator unit and that is far away from the reflection plate, the first director apparatus comprises a plurality of metal sheets, and the metal sheets are respectively coupled to the radiator arms.

7. The dual-band antenna according to claim 6, wherein a second director apparatus is disposed on a side that is of the first director apparatus and that is far away from the first radiator unit, the second director apparatus comprises at least one metal sheet, and the at least one metal sheet is disposed close to a center of the first radiator unit.

8. The dual-band antenna according to claim 1, wherein the second radiating element comprises a second feeding apparatus and a second radiator unit, and the second feeding apparatus is electrically connected to the second radiator unit.

9. The dual-band antenna according to claim 1, wherein an operating frequency of the first radiating element is outside the second frequency band by changing a sum of an electrical length of a radiator arm of the first radiator unit and an electrical length of the first feeding apparatus.

10. An antenna array, wherein the antenna array comprises at least two dual-band antennas and a reflection plate, wherein each of the at least two dual-band antennas is electrically connected to the reflection plate, and each of the at least two dual-band antennas comprises:

a first radiating element and a second radiating element that are disposed on the reflection plate, wherein:

an operating frequency band of the first radiating element is a first frequency band, an operating frequency band of the second radiating element is a second frequency band, and a minimum frequency of the first frequency band is greater than a maximum frequency of the second frequency band; and the first radiating element comprises a first feeding apparatus and a first radiator unit, the first feeding apparatus comprises a coupling structure coupled to the first radiator unit, the coupling structure comprises a plurality of horizontal arms and a plurality of vertical arms, the horizontal arms are symmetrical with respect to a central axis of the first radiator unit, each horizontal arm is coupled to one radiator arm, a spacing between a horizontal arm and a radiator arm that are coupled to each other is less than a preset value, the vertical arms are disposed close to the central axis of the first radiator unit, the vertical arms are configured to connect the horizontal arms and the reflection plate, the horizontal arms and the vertical arms from an inverted L-shaped conductive plate structure, and the first feeding apparatus is used for coupled feeding for the first radiator unit by using the coupling structure, wherein the coupling structure is configured to:

transmit a signal of the first frequency band; and block a signal of the second frequency band;

wherein:

a gap is provided between the vertical arms, the first feeding apparatus further comprises crossed feeding sheets, the feeding sheets are disposed in the gap between the vertical arms, and the feeding sheets are electrically connected to a feeding port on the reflection plate; or the first feeding apparatus further comprises a feeder disposed on the vertical arms, and the feeder is electrically connected to a feeding port on the reflection plate.

11. The antenna array according to claim 10, wherein the first radiator unit comprises four radiator arms, the four radiator arms are symmetrical with respect to the central axis of the first radiator unit, and a length l of each radiator arm satisfies wherein λ

$$\left|l - \frac{\lambda}{8}\right| \leq A_1,$$

is a wavelength of an electromagnetic wave of the first frequency band, and wherein $A_1$ is a preset error threshold.

12. The antenna array according to claim 11, wherein a frequency in the first frequency band is twice a frequency in the second frequency band, and an equivalent electrical length of the coupling structure is less than one quarter of a wavelength corresponding to the second frequency band.

13. The antenna array according to claim 11, wherein each radiator arm is a conductor arm or a slot disposed in a conductor plate.

14. The antenna array according to claim 11, wherein a first director apparatus is disposed on a side that is of the first radiator unit and that is far away from the reflection plate, the first director apparatus comprises a plurality of metal sheets, and the metal sheets are respectively coupled to the radiator arms.

15. The antenna array according to claim 14, wherein a second director apparatus is disposed on a side that is of the first director apparatus and that is far away from the first radiator unit, the second director apparatus comprises at least one metal sheet, and the at least one metal sheet is disposed close to a center of the first radiator unit.

16. The antenna array according to claim 10, wherein the second radiating element comprises a second feeding apparatus and a second radiator unit, and the second feeding apparatus is electrically connected to the second radiator unit.

* * * * *